United States Patent
Tanaka et al.

(10) Patent No.: US 10,765,138 B2
(45) Date of Patent: Sep. 8, 2020

(54) SHEET-SHAPED FOOD PRODUCT

(71) Applicant: TANAKA FOODS CO., LTD., Hiroshima (JP)

(72) Inventors: Shigeki Tanaka, Hiroshima (JP); Yoshiharu Fujinaka, Hiroshima (JP); Fumio Nishimoto, Hiroshima (JP); Shin Iguchi, Hiroshima (JP)

(73) Assignee: TANAKA FOODS CO., LTD., Hiroshima (JP)

( * ) Notice: Subject to any disclaimer, the term of this patent is extended or adjusted under 35 U.S.C. 154(b) by 0 days.

(21) Appl. No.: 16/116,606

(22) Filed: Aug. 29, 2018

(65) Prior Publication Data

US 2019/0200666 A1    Jul. 4, 2019

(30) Foreign Application Priority Data

Dec. 28, 2017   (JP) .................. 2017-254976

(51) Int. Cl.
| | |
|---|---|
| *A23P 20/20* | (2016.01) |
| *A23P 10/47* | (2016.01) |
| *A23L 7/196* | (2016.01) |
| *A23L 3/48* | (2006.01) |

(52) U.S. Cl.
CPC .............. *A23P 20/20* (2016.08); *A23L 3/485* (2013.01); *A23L 7/1963* (2016.08); *A23P 10/47* (2016.08)

(58) Field of Classification Search
CPC ................................ A23P 10/47; A23P 20/20

USPC .......................................................... 426/89
See application file for complete search history.

(56) References Cited

U.S. PATENT DOCUMENTS

| | | | | |
|---|---|---|---|---|
| 2003/0224090 | A1* | 12/2003 | Pearce ..................... | A23G 3/36 426/89 |
| 2006/0051464 | A1* | 3/2006 | McHugh ................ | B65D 65/46 426/120 |

FOREIGN PATENT DOCUMENTS

| | | | | |
|---|---|---|---|---|
| JP | S59-59142 | A | 4/1984 | |
| JP | S61-195672 | A | 8/1986 | |
| JP | S63-216439 | A | 9/1988 | |
| JP | S64-13972 | A | 1/1989 | |
| JP | 2001-211838 | A | 8/2001 | |
| JP | 2004-000134 | A | 1/2004 | |
| JP | 2004-267151 | A | 9/2004 | |
| JP | 2008-512119 | A | 4/2008 | |
| JP | 2014-117280 | A | 6/2014 | |
| JP | 2014-168419 | A | 9/2014 | |
| WO | WO-2006029128 | A3 * | 2/2007 | ............. B65D 65/46 |

\* cited by examiner

*Primary Examiner* — Jyoti Chawla

(74) *Attorney, Agent, or Firm* — Studebaker & Brackett PC

(57) ABSTRACT

A sheet-shaped food product is a sheet-shaped food product molded by containing a raw food material and a binding agent, in which the sheet-shaped food product is provided with a surface layer at both sides and an inner side layer, which is present between the surface layers and has lower density than each surface layer, and mass ratio (WA/WB) of dry mass of the raw food material (WA) to dry mass of the binding agent 3 (WB) is 4.9 to 7.3.

13 Claims, 2 Drawing Sheets

SHEET-SHAPED FOOD PRODUCT

This application is based on and claims the benefit of priority from Japanese Patent Application No. 2017-254976, filed on 28 Dec. 2017, the content of which is incorporated herein by reference.

BACKGROUND OF THE INVENTION

Field of the Invention

The present invention relates to a sheet-shaped food product.

Related Art

Conventionally, a sheet-shaped food product represented by laver has been widely used for laver roll, rice ball, or the like. However, the sheet-shaped food product is thin and easily breakable. Due to such reasons, a technique of forming a gel-like film on a surface of laver by coating laver with a solution of alginic acid followed by impregnation in a solution containing cations with valency of 2 or more is suggested (see Patent Document 1, for example). By using the technique described in Patent Document 1, a sheet-shaped food product which is hardly breakable and has a volume (thickness) is obtained.

Patent Document 1: Japanese Unexamined Patent Application, Publication No. 2004-267151

SUMMARY OF THE INVENTION

However, as the volume (thickness) of a sheet-shaped food product increases or the strength of a sheet-shaped food product increases, lower flexibility is yielded. As lower flexibility of a sheet-shaped food product is yielded, the sheet-shaped food product becomes easily breakable. Accordingly, the operability (handling ability) of a sheet-shaped food product is deteriorated, and thus a phenomenon like easy breaking occurs in the case of a rice ball, for example. Due to such reasons, there has been a demand for a sheet-shaped food product having both the volume and strength, and flexibility.

An object of the present invention is to provide a sheet-shaped food product capable of having both the volume and strength, and flexibility.

The present invention relates to a sheet-shaped food product that is molded by containing a raw food material and a binding agent, in which the sheet-shaped food product is provided with a surface layer at both sides and an inner side layer, which is present between the surface layers and has lower density than each of the surface layers, and mass ratio (WA/WB) of dry mass of the raw food material (WA) to dry mass of the binding agent (WB) is 4.9 to 7.3.

Furthermore, according to the present invention, a moisture retention agent may be additionally contained, and mass ratio (WA/WC) of dry mass of the raw food material (WA) to dry mass of the moisture retention agent (WC) may be 0.8 to 1.3.

Furthermore, a total thickness of the sheet-shaped food product may be 140 to 400 μm.

Furthermore, the inner side layer is substantially void and a thickness of the inner side layer may be 20 to 120 μm.

Furthermore, the inner side layer is substantially void and a thickness of the two surface layers may be 40 to 140 μm for each.

Furthermore, the raw food material may be at least one selected from the group consisting of leaf vegetables that can pass through a sieve with a mesh size of 1.5 to 3 mm, root vegetables that can pass through a sieve with a mesh size of 0.5 to 2 mm, fishes and shellfishes that can pass through a sieve with a mesh size of 1.5 to 3 mm, sea weeds that can pass through a sieve with a mesh size of 0.5 to 3 mm, and beans that can pass through a sieve with a mesh size of 0.2 mm or less.

According to the present invention, a sheet-shaped food product capable of having both the volume and strength, and flexibility can be provided.

DETAILED DESCRIPTION OF THE INVENTION

Hereinbelow, descriptions are given for embodiments of the present invention by using drawings.

[Sheet-Shaped Food Product]

Figure 1:
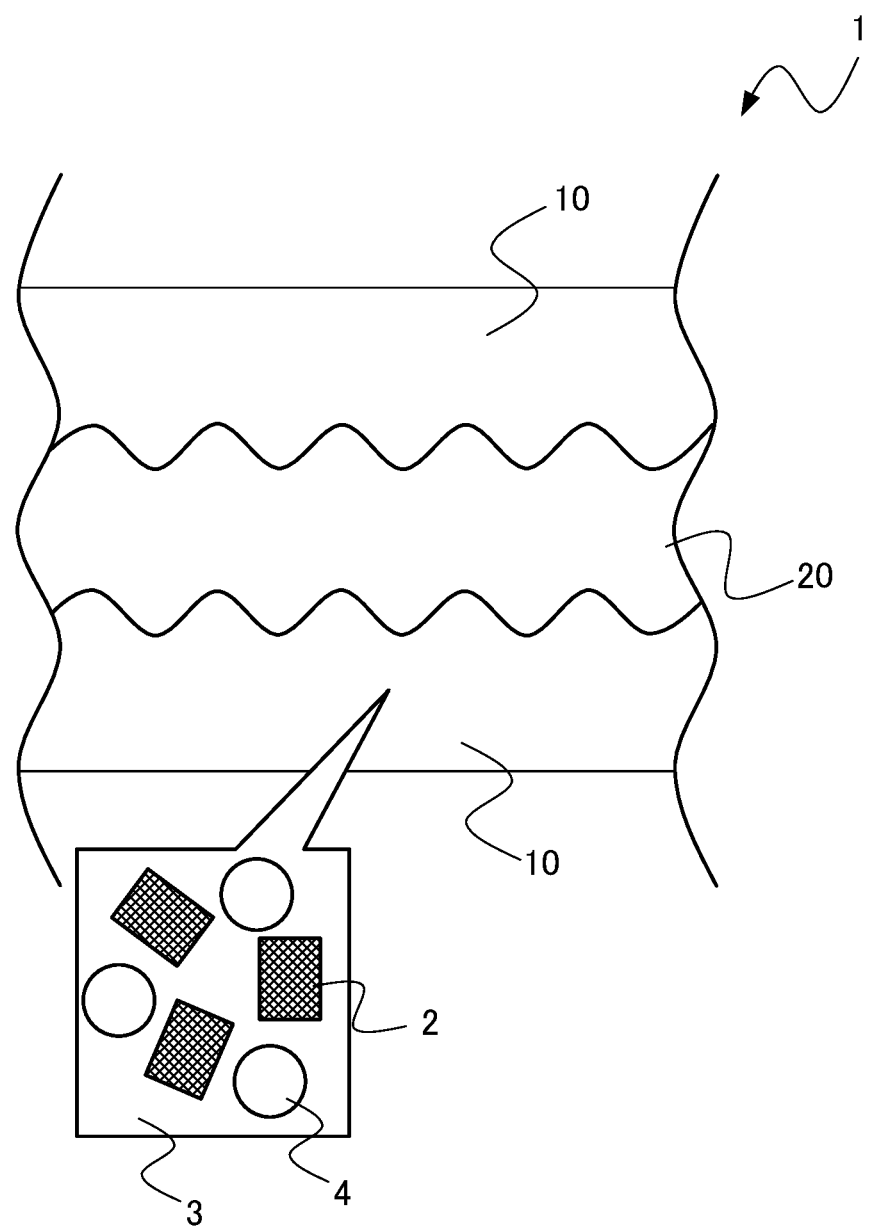
FIG. 1 is a schematic cross-sectional view of a sheet-shaped food product according to an embodiment of the present invention.

FIG. 1 is a schematic cross-sectional view of a sheet-shaped food product according to an embodiment of the present invention. As illustrated in FIG. 1, a sheet-shaped food product 1 contains a raw food material 2 and a binding agent 3. According to this embodiment, the sheet-shaped food product 1 additionally contains a moisture retention agent 4. Furthermore, the sheet-shaped food product 1 is provided with a surface layer 10 at both sides in a thickness (volume) direction, and an inner side layer 20, which is present between the surface layers 10 and has lower density than each surface layer 10. In other words, the sheet-shaped food product 1 is a sheet-shaped food product having a three-layer structure including the first surface layer 10, the inner side layer 20, and the second surface layer 10.

<Raw Food Material>

The raw food material 2 is a processed product that is obtained by adding, if necessary, a seasoning or a coloring agent to a food material. The food materials to be included in the raw food material 2 are broadly categorized into vegetables, fishes and shellfishes, sea weeds, beans, and the like. Those food materials are selected in accordance with a use of the sheet-shaped food product 1.

The vegetables to be included in the raw food material 2 are broadly categorized into leaf vegetables, root vegetables, or the like. Examples of the leaf vegetables include shiso (*perilla*), radish leaves, spinach, Japanese mustard spinach, nozawana, leaf mustard, hiroshimana, Chinese cabbage, kyona, cabbage, *angelica keiseki*, bok choy, basil, Jew's mallow, and the like. Examples of the root vegetables include carrot, turnip, burdock, potato, sweet potato, taro, yam, lotus root, ginger, and the like. Furthermore, it is possible that a root part of radish and a leaf part of carrot are used for the raw food material 2, as root vegetables and leaf vegetables, respectively. Similarly, even for the same vegetable, there is a vegetable of which leaf part is used as leaf vegetables while root part is used as root vegetables.

Furthermore, examples of the fishes and shellfishes that are included in the raw food material 2 include salmon, skipjack, porgy, tuna, mackerel, cod, Japanese horse mackerel, sardine, squid, shrimp, crab, scallop, clam, oyster, sea urchin, cod roe, and the like.

Furthermore, examples of the sea weeds that are included in the raw food material 2 include wakame (brown sea-weed), hijiki, kelp, root of wakame, red *Meristotheca papulosa*, green *Meristotheca papulosa*, funori, *porphyra tenera*, sea lettuce, and the like. Meanwhile, the present invention is preferably applied when sea weeds other than so-called laver (Japanese dried sea weed) such as *porphyra tenera* or sea lettuce are used as the raw food material. That is because, due to the appearance with black color, laver may not be preferred by people in a country other than Asian countries (for example, Northern American countries).

Furthermore, examples of the beans that are included in the raw food material 2 include soy bean (including soy bean powder and defatted soy bean), red bean, green pea, pea, fava bean, nightingale bean, and the like.

The raw food material 2 is not particularly limited in terms of the shape and size. However, in a case in which leaf vegetables are included in the raw food material 2, the raw food material 2 is processed into a flake shape which can pass through a sieve with a mesh size of 1.5 to 3 mm (preferably, 2 to 2.5 mm), for example.

Furthermore, as described herein, the expression, "which can pass through a sieve with a mesh size of n (n=length)" indicates a size that, when the processed raw food material 2 is caused to pass through a sieve with a mesh size of n, the processed raw food material 2 passes through the sieve and drops freely. Furthermore, the expression "flake shape" as described herein indicates a thin layer shape that is obtained by drying a material, and it includes a three-dimensional shape (for example, globular shape and rectangular shape) other than a flat shape like thin layer.

Furthermore, in a case in which root vegetables are included in the raw food material 2, the raw food material 2 is processed into a flake shape which can pass through a sieve with a mesh size of 0.5 to 2 mm (preferably, 1 to 1.5 mm).

Furthermore, in a case in which fishes and shellfishes are included in the raw food material 2, the raw food material 2 is processed into a flake shape which can pass through a sieve with a mesh size of 1.5 to 3 mm (preferably, 2 to 2.5 mm).

Furthermore, in a case in which sea weeds are included in the raw food material 2, the raw food material 2 is processed into a flake shape or a powder state which can pass through a sieve with a mesh size of 0.5 to 3 mm (preferably, 1 to 2.5 mm).

Furthermore, in a case in which beans are included in the raw food material 2, the raw food material 2 is processed into a powder state which can pass through a sieve with a mesh size of 0.2 mm or less.

Examples of the seasoning to be included in the raw food material 2 include salt, sugar, glucose, soy sauce, sweet sake, brewed vinegar, miso paste, stock (kelp, skipjack, shiitake mushroom), extract of fishes and shellfishes, citric acid, malic acid, and sodium glutamate. Furthermore, examples of the coloring agent to be included in the raw food material 2 include carotene pigment, red koji pigment, paprika pigment, and *gardenia* pigment. Herein, as the taste of the material may not be easily recognized due to the seasoning and pigment, it is preferable that a seasoning or a pigment is not included in the raw food material 2. On the other hand, in a case in which a seasoning or a pigment is included in the raw food material 2, the seasoning or pigment is preferably selected in accordance with the food material or a use of the sheet-shaped food product 1.

<Binding Agent>

The binding agent 3 is used for increasing the strength of the sheet-shaped food product 1. The binding agent 3 contains, at a predetermined ratio, konjac (for example, konjac powder, manufactured by Shimizu Chemical Corporation), pectin (for example, PECTIN HR-450, manufactured by Organo Food Tech Corporation), tamarind gum (for example, GLYROID 3S, manufactured by Sumitomo Dainippon Pharma Co., Ltd.), agar, carrageenan, alginic acid, guar gum, xanthan gum, and the like.

In the sheet-shaped food product 1, mass ratio (WA/WB) of dry mass of the raw food material 2 (WA) to dry mass of the binding agent 3 (WB) is 4.9 to 7.3, and preferably 5.4 to 6.8. If the mass ratio (WA/WB) is less than 4.9, the raw food material 2 is insufficient so that it becomes difficult to feel the taste of the material. On the other hand, if the mass ratio (WA/WB) is more than 7.3, the binding agent 3 is insufficient so that it becomes difficult to have the strength. Furthermore, as described herein, the dry mass indicates the mass in a state at which the sheet-shaped food product is considered to be almost dry.

<Moisture Retention Agent>

The moisture retention agent 4 contains, for example, reduced water syrup (for example, AMAMIN 500MC, manufactured by MC Food Specialties Inc.), sorbitol (for example, SORBITOL F, manufactured by B Food Science Co., Ltd.), mannitol, maltitol, erythritol, or the like, at a predetermined ratio.

In the sheet-shaped food product 1, mass ratio (WA/WC) of dry mass of the raw food material 2 (WA) to dry mass of the moisture retention agent 4 (WC) is 0.8 to 1.3, and preferably 0.9 to 1.2. If the mass ratio (WA/WC) is less than 0.8, the raw food material 2 is insufficient so that it becomes difficult to feel the taste of the material. In addition, as the moisture retention agent 4 is present in a large amount, it becomes difficult to obtain crispy mouth feel of a sheet-shaped food product. On the other hand, if the mass ratio (WA/WC) is more than 1.3, the moisture retention agent 4 is insufficient so that the moisture retention property of the sheet-shaped food product 1 is deteriorated. Once the moisture retention property of the sheet-shaped food product 1 is deteriorated, there may be a case in which the operability after long-term storage is impaired. In addition, also from the viewpoint of the production that is described below, it is preferable to have a high moisture retention property of the sheet-shaped food product 1.

[Production Example]

Figure 2:
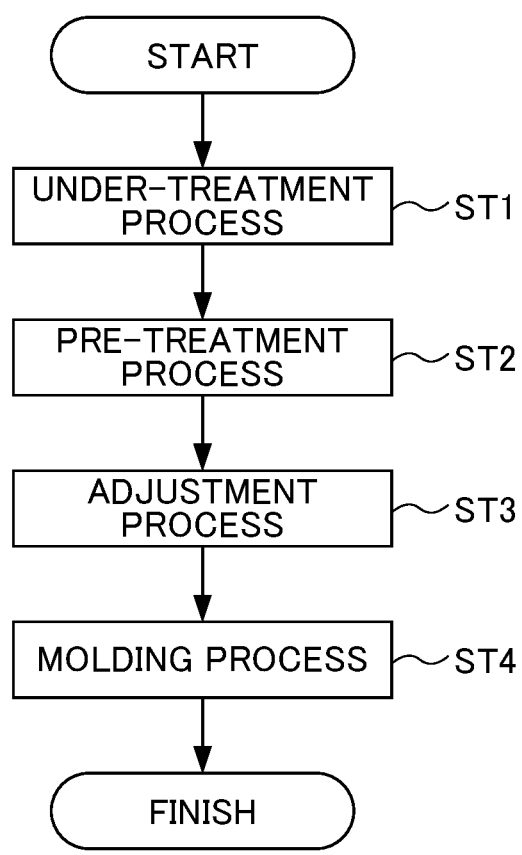
FIG. 2 is a flowchart illustrating one example of the process for producing a sheet-shaped food product according to an embodiment of the present invention.

Subsequently, the method for producing the sheet-shaped food product 1 according to this embodiment is described by using FIG. 2. FIG. 2 is a flowchart illustrating one example of the process for producing a sheet-shaped food product 1 according to an embodiment of the present invention. As illustrated in FIG. 2, the process for producing a sheet-shaped food product 1 according to this embodiment includes an under-treatment process ST1, a pre-treatment process ST2, an adjustment process ST3, and a molding process ST4, for example. Furthermore, although it may depend on the freshness or the like of the raw food material 2, there may be also a case in which the under-treatment process ST1 and the pre-treatment process ST2 are omitted, and the raw food material 2 is directly processed (adjusted, or molded).

<Under-Treatment Process>

The under-treatment process ST1 is a process which is specific to each food material. Hereinbelow, representative examples of the food material are described and an example of the under-treatment thereof is described.

When shiso (leaf vegetables) is included in the food material, the under-treatment process ST1 includes processes like (1) washing shiso, (2) immersing the shiso in seasoning like salt and citric acid, and (3) selecting the shiso.

When radish leaves (leaf vegetables) are included in the food material, the under-treatment process ST1 includes processes like (1) washing and sterilizing radish leaves, (2) cutting the radish leaves, (3) blanching the radish leaves, (4) seasoning the radish leaves with a seasoning like salt and glucose, and (5) drying the radish leaves. According to those under-treatments, so-called seasoned dry vegetables are obtained. Furthermore, instead of the processes (4) and (5), it is possible that the blanched vegetables (radish leaves) are directly frozen and preserved to give frozen vegetables, or the blanched vegetables are dehydrated and preserved under freezing to give frozen and salted compressed vegetables. Also, in a case in which carrot (root vegetables) is included in the food material, the under-treatment process ST1 includes the same processes as the case in which radish leaves (leaf vegetables) are included.

When salmon (fishes and shellfishes) is included in the food material, the under-treatment process ST1 includes processes like (1) removing a head part, a gill, and intestines from the salmon, (2) steaming the treated salmon, and (3) obtaining flesh from the salmon (removing skin and bone from salmon). It is also possible to freeze the salmon flesh.

When wakame (sea weeds) is included in the food material, the under-treatment process ST1 includes processes like (1) cutting salted wakame, (2) washing the wakame, (3) dehydrating the wakame, (4) drying the sea weed, and (5) selecting the sea weed.

When soy bean powder (bean) is included in the food material, the under-treatment process ST1 includes processes like (1) selecting soy bean, (2) stir-frying the soy bean, and (3) milling the soy bean so that it can pass through a sieve with a mesh size of 150 to 180 µm. When defatted soy bean (bean) is included in the food material, the under-treatment process ST1 includes a process of mixing defatted soy bean powder and powder fat, with water. When red bean (bean) is included in the food material, the under-treatment process ST1 includes a process of mixing a red bean powder material with water.

<Pre-Treatment Process>

Like the under-treatment process ST1, the pre-treatment process ST2 is a process which is specific to each food material. Hereinbelow, representative examples of the food material are described and an example of the pre-treatment thereof is described.

When shiso (leaf vegetables) is included in the food material, the pre-treatment process ST2 includes processes like (1) cutting the shiso salted by the under-treatment process ST1 into a large size (for example, square with sides of 15 mm), (2) immersing the shiso in washing bath, (3) cutting the shiso into a small size (for example, square with sides of 1 to 2 mm), (4) dehydrating the shiso, (5) desalting the shiso by using citric acid solution or the like, (6) further dehydrating the shiso, and (7) compressing the shiso. According to the under-treatment process ST1 and the pre-treatment process ST2, shiso (leaf vegetables) is processed into a flake shape which can pass through a sieve with a mesh size of 1.5 to 3 mm, for example.

When radish leaves (leaf vegetables) are included in the food material, the pre-treatment process ST2 includes processes like (1) desalting the radish leaves, which have been dried by the under-treatment process ST1, using a large amount of water (for example, water with an amount of 10 times), (2) dehydrating the radish leaves, and (3) compressing the radish leaves. When carrot (root vegetables) is included in the food material, the pre-treatment process ST2 includes the same processes as in a case in which radish leaves (leaf vegetables) are included in the food material. According to the under-treatment process ST1 and the pre-treatment process ST2, radish leaves (leaf vegetables) are processed into a flake shape which can pass through a sieve with a mesh size of 1.5 to 3 mm, for example, and carrot (leaf vegetables) is processed into a flake shape which can pass through a sieve with a mesh size of 0.5 to 2 mm, for example.

When salmon (fishes and shellfishes) is included in the food material, the pre-treatment process ST2 includes a process of adding seasoning like salmon extract and salt or a coloring agent to salmon flesh. According to the under-treatment process ST1 and the pre-treatment process ST2, salmon (fishes and shellfishes) is processed into a flake shape.

When wakame (sea weeds) is included in the food material, the pre-treatment process ST2 includes processes like (1) shredding selected wakame, (2) classifying the wakame by using a sieve with a mesh size of 1 mm, (3) adding water to the wakame, and (4) compressing the wakame. According to the under-treatment process ST1 and the pre-treatment process ST2, wakame (sea weeds) is processed into a powder state which can pass through a sieve with a mesh size of 1 mm, for example. Furthermore, the wakame (sea weeds) may be also processed, instead of the powder state, into a flake shape which can pass through a sieve with a mesh size of 3 mm, for example. The under-treatment process ST1 and the pre-treatment process ST2 for wakame in that case include the same processes as in a case in which shiso (leaf vegetables), radish leaves (leaf vegetables), or carrot (root vegetables) are included.

When bean (soy bean powder, defatted soy bean, red bean) is included in the food material, the pre-treatment process ST2 includes a process of adding water to soy bean powder, defatted soy bean powder, red bean powder, or the like. According to the under-treatment process ST1 and the pre-treatment process ST2, bean (soy bean powder, defatted soy bean, red bean) is processed into a powder state (paste state containing water) which can pass through a sieve with a mesh size of 0.2 mm, for example.

By processing the food material to have a suitable size or shape according to the under-treatment process ST1 and the pre-treatment process ST2 that are described above, the sheet-shaped food product 1 having distinct color and enabling better recognition of the taste of the material can be produced.

<Adjustment Process>

The adjustment process ST3 is basically a treatment process that is common irrespective of the raw food material 2. The adjustment process ST3 is a process of adding the binding agent 3 and the moisture retention agent 4 to the raw food material 2 in flake shape or in powder state (paste state containing water). The binding agent 3 is added to the raw food material 2 such that mass ratio (WA/WB) of dry mass of the raw food material 2 (WA) to dry mass of the binding agent 3 (WB) is 4.9 to 7.3. Furthermore, the moisture retention agent 4 is added to the raw food material 2 such that mass ratio (WA/WC) of dry mass of the raw food material 2 (WA) to dry mass of the moisture retention agent 4 (WC) is 0.8 to 1.3.

When shiso (leaf vegetables) in flake shape is included in the raw food material 2, it is preferable that the binding agent 3 is added to shiso (leaf vegetables) by the adjustment process ST3 such that the mass ratio (WA/WB) is 5.3 to 6.3. Furthermore, it is preferable that the moisture retention agent 4 is added to shiso (leaf vegetables) such that the mass ratio (WA/WC) is 1.0 to 1.2.

When radish leaves (leaf vegetables) in flake shape are included in the raw food material 2, it is preferable that the binding agent 3 is added to radish leaves (leaf vegetables) by the adjustment process ST3 such that the mass ratio (WA/WB) is 5.6 to 6.6. Furthermore, it is preferable that the moisture retention agent 4 is added to radish leaves (leaf vegetables) such that the mass ratio (WA/WC) is 1.1 to 1.3.

When carrot (root vegetables) in flake shape is included in the raw food material 2, it is preferable that the binding agent 3 is added to carrot (root vegetables) by the adjustment process ST3 such that the mass ratio (WA/WB) is 4.9 to 5.9. Furthermore, it is preferable that the moisture retention agent 4 is added to carrot (root vegetables) such that the mass ratio (WA/WC) is 0.8 to 1.0.

When salmon (fishes and shellfishes) in flake shape is included in the raw food material 2, it is preferable that the binding agent 3 is added to salmon (fishes and shellfishes) by the adjustment process ST3 such that the mass ratio (WA/WB) is 5.3 to 6.3. Furthermore, it is preferable that the moisture retention agent 4 is added to salmon (fishes and shellfishes) such that the mass ratio (WA/WC) is 1.0 to 1.2.

When wakame (sea weeds) in flake shape or in powder state is included in the raw food material 2, it is preferable that the binding agent 3 is added to wakame (sea weeds) by the adjustment process ST3 such that the mass ratio (WA/WB) is 5.0 to 6.0. Furthermore, it is preferable that the moisture retention agent 4 is added to wakame (sea weeds) such that the mass ratio (WA/WC) is 1.0 to 1.2.

When soy bean powder (bean) in powder state is included in the raw food material 2, it is preferable that the binding agent 3 is added to soy bean powder (bean) by the adjustment process ST3 such that the mass ratio (WA/WB) is 6.3 to 7.3. Furthermore, it is preferable that the moisture retention agent 4 is added to soy bean powder (bean) such that the mass ratio (WA/WC) is 1.1 to 1.3.

When defatted soy bean (bean) in powder state is included in the raw food material 2, it is preferable that the binding agent 3 is added to defatted soy bean (bean) by the adjustment process ST3 such that the mass ratio (WA/WB) is 5.1 to 6.1. Furthermore, it is preferable that the moisture retention agent 4 is added to defatted soy bean (bean) such that the mass ratio (WA/WC) is 0.8 to 1.0.

When red bean (bean) in powder state is included in the raw food material 2, it is preferable that the binding agent 3 is added to red bean (bean) by the adjustment process ST3 such that the mass ratio (WA/WB) is 5.2 to 6.2. Furthermore, it is preferable that the moisture retention agent 4 is added to red bean (bean) such that the mass ratio (WA/WC) is 0.9 to 1.1.

As the mass ratio (WA/WB) and mass ratio (WA/WC) fall within the above range for each raw food material 2, the volume, strength, and moisture retention property of the sheet-shaped food product 1 are obtained at sufficient level, and thus better recognition of the taste of the material of the sheet-shaped food product 1 can be achieved.

<Molding Process>

The molding process ST4 is basically a treatment process that is common irrespective of the raw food material 2. Furthermore, heating temperature, rotation speed or the like of a drum that are described below may be different for each food material.

According to the molding process ST4, the raw food material 2 added with the binding agent 3 and the moisture retention agent 4 are introduced first to a drum which has been heated to 110° C. or higher. Furthermore, by rotating the drum, the first surface layer 10 having one dried surface is formed. In this state, the surface opposite to the dried surface of the first surface layer 10 is not completely dried, and thus remains in a soft state. Similarly, the second surface layer 10 with one dried surface is formed. In this state, the surface opposite to the dried surface of the second surface layer 10 is not completely dried, and thus remains in a soft state.

Subsequently, the non-dried surface of the first surface layer 10 and the non-dried surface of the second surface layer 10 are attached with each other. The non-dried surfaces are dried by further applying heat or by residual heat of the surface layer 10, and between the surface layers 10, the inner side layer 20, which is substantially void, is formed. Furthermore, as described herein, the expression "substantially void" includes a state in which a part having a contact between the inner side layers 20 is present at plural sites, and it is not limited to a shape in which the entire space between the inner side layers 20 is void.

Subsequently, the sheet-shaped food product is wound on a roll. According to this embodiment, the sheet-shaped food product 1 contains the moisture retention agent 4. As such, the sheet-shaped food product 1 having a moisture retention property is easily adaptable to an environment (humidity) after the inner side layer 20 is formed therein, and thus it can be easily wound on a roll. On the other hand, if the moisture retention agent 4 is not contained, the sheet-shaped food product 1 has a surface remaining in a dry state even after the inner side layer 20 is formed therein, and thus it is difficult to wind the product on a roll. Furthermore, this process is a process for managing the sheet-shaped food product by winding it on a roll, and it can be omitted.

According to the processes described above, the sheet-shaped food product 1 having the inner side layer 20, which is present between the surface layers 10 and has lower density than each surface layer 10 (in this embodiment, substantially void), is produced. Furthermore, by using plural drums, for example, two surface layers 10 and the inner side layer 20 may be integrally formed.

Herein, when the case of bending the sheet-shaped food product 1 is assumed (for example, winding on boiled rice), it is considered that the sheet-shaped food product 1 having no inner side layer 20 cannot release the force applied in accordance with the bending to a space between the surface layers 10. On the other hand, according to the sheet-shaped food product 1 of this embodiment, the force applied in accordance with the bending can be released to the inner side layer 20. Furthermore, the inner side layer 20 has lower density than each surface layer 10, and has high flexibility. Due to such reasons, the sheet-shaped food product 1 of this embodiment can release the force applied in according with the bending to the inner side layer 20 having high flexibility. Accordingly, overall flexibility of the sheet-shaped food product 1 is enhanced. Furthermore, as the inner side layer 20 is formed, overall volume of the sheet-shaped food product 1 can be also ensured.

With regard to the molding process ST4, the molding thickness of the sheet-shaped food product 1 is not particularly limited. However, the overall thickness of the sheet-shaped food product 1 is 140 to 400 μm, for example. Accordingly, the sheet-shaped food product 1 can have optimum volume, and thus yielding more favorable mouth feel (feel upon chewing and touch feel on tongue). Furthermore, the inner side layer 20 is substantially void, and the thickness of the inner side layer 20 is 20 to 120 μm, for example. Accordingly, flexibility of the sheet-shaped food product 1 can be further enhanced. In addition, the volume can be also obtained. Furthermore, the inner side layer 20 is substantially void, and the thickness of each of the two surface layers 10 is 40 to 140 μm, for example. Accordingly, strength of the sheet-shaped food product 1 can be further enhanced. Furthermore, if the overall thickness of the sheet-shaped food product 1, the thickness of the surface layer 10, or thickness of the inner side layer 20 is extremely high, wrinkles are likely to generate on a surface of the sheet-shaped food product 1.

The sheet-shaped food product 1 according to the present invention which is constituted as described above is the sheet-shaped food product 1 that is molded by containing the raw food material 2 as a raw food material and the binding agent 3, in which it is provided with the surface layer 10 at both sides and the inner side layer 20, which is present between the surface layers 10 and has lower density than each surface layer 10, and mass ratio (WA/WB) of dry mass of the raw food material 2 (WA) to dry mass of the binding agent 3 (WB) is 4.9 to 7.3. With the inner side layer 20, it is possible to achieve the sheet-shaped food product 1 having both the flexibility and volume. Furthermore, as the mass ratio (WA/WB) is 4.9 to 7.3, strength of the sheet-shaped food product 1 can be enhanced, and taste of the material of the sheet-shaped food product 1 can be further recognized. As such, the sheet-shaped food product 1 according to the present invention can have both the volume and strength, and flexibility and also enables the recognition of the taste of the material.

Furthermore, the sheet-shaped food product 1 additionally contains the moisture retention agent 4 and mass ratio (WA/WC) of dry mass of the raw food material 2 (WA) to dry mass of the moisture retention agent 4 (WC) is 0.8 to 1.3. Accordingly, the sheet-shaped food product 1 has not only a sufficient moisture retention property but also a favorable mouth feel, thus enabling the recognition of the taste of the material.

Furthermore, the overall thickness of the sheet-shaped food product 1 is 140 to 400 μm, for example. Accordingly, the sheet-shaped food product 1 can have optimum volume. Furthermore, the inner side layer 20 is substantially void, and the thickness of the inner side layer 20 is 20 to 120 μm, for example. Accordingly, the sheet-shaped food product 1 can have optimum flexibility. Furthermore, the inner side layer 20 is substantially void, and a thickness of each of the two surface layers 10 is 40 to 140 μm, respectively, for example. Accordingly, the sheet-shaped food product 1 can have optimum strength. According to this constitution, the sheet-shaped food product 1 can have favorable mouth feel (feel upon chewing and touch feel on tongue).

Furthermore, the raw food material 2 is at least one selected from the group consisting of leaf vegetables that can pass through a sieve with a mesh size of 1.5 to 3 mm, root vegetables that can pass through a sieve with a mesh size of 0.5 to 2 mm, fishes and shellfishes that can pass through a sieve with a mesh size of 1.5 to 3 mm, sea weeds that can pass through a sieve with a mesh size of 0.5 to 3 mm, and beans that can pass through a sieve with a mesh size of 0.2 mm or less. Accordingly, the sheet-shaped food product 1 having distinct color and enabling better recognition of the taste of the material can be produced.

Furthermore, the present invention is not limited to the embodiments that are described above, and modifications, improvements, and the like are included in the present invention as long as they are within a range in which the object of the present invention can be achieved.

For example, the description is given in a case in which the inner side layer 20 is substantially void, but it is not limited thereto. It is possible that, by adjusting the mass ratio (WA/WB) of dry mass of the raw food material 2 (WA) to dry mass of the binding agent 3 (WB) or the like, the inner side layer 20 (not void) which has lower density than each surface layer 10 can be formed.

Furthermore, although the description is given in a case in which the food materials included in the raw food material 2 are broadly categorized into vegetables, fishes and shellfishes, sea weeds, beans, or the like, any food material other than the vegetables, fishes and shellfishes, sea weeds, and beans can be also used. For example, fruits (fruit flesh and fruit skin) can be also used as a food material.

EXAMPLES

Hereinbelow, the present invention is described in greater detail based on Examples, but the present invention is not limited by those Examples.

Example 1

According to the production method described above, a sheet-shaped food product was produced in which carrot is used as the raw food material, mass ratio (WA/WB) of dry mass of the raw food material (WA) to dry mass of the binding agent (WB) is 4.9, and mass ratio (WA/WC) of dry mass of the raw food material (WA) to dry mass of the moisture retention agent (WC) is 0.8.

The sheet-shaped food product has an inner side layer and both side of surface layers, which are 70 μm and 90 μm, respectively. It remains the same for Example 2 to Example 16, Comparative Example 1, and Comparative Example 2 that are described below. Furthermore, the thickness of the inner side layer, the thickness of the surface layer, and the overall thickness of each Example and Comparative Example are obtained by observing a cross-section of the sheet-shaped food product.

Example 2 to Example 4, Comparative Example 1

The sheet-shaped food product was produced in the same manner as Example 1 except that the mass ratio (WA/WB) of dry mass of the raw food material (WA) to dry mass of the binding agent (WB) has a value shown in Table 1.

[Operability Test]

A test of winding the sheet-shaped food product of Example 1 to Example 4, and Comparative Example 1 on a rice ball was carried out. The test was repeatedly carried out with monitoring by five people, four times for each. When the sheet-shaped food product can be wound on a rice ball, it was defined as a success. On the other hand, when the sheet-shaped food product is folded or broken so that it cannot be wound on a rice ball, it was defined as a failure. The success rate is shown in Table 1. Furthermore, if the success rate is 95% or higher, it is considered that the volume and strength, and also the flexibility can be obtained at sufficient level even when compared to a conventional sheet-shaped food product (for example, laver).

TABLE 1

|  | Raw food material | WA/WB | WA/WC | Success rate in operability test |
|---|---|---|---|---|
| Example 1 | Carrot | 4.9 | 0.8 | 100% |
| Example 2 | Carrot | 5.4 | 0.8 | 97.5% |
| Example 3 | Carrot | 6.8 | 0.8 | 97.5% |
| Example 4 | Carrot | 7.3 | 0.8 | 95% |
| Comparative Example 1 | Carrot | 9.7 | 0.8 | 60% |

As shown in Table 1, in a case in which carrot is used as the raw food material, the success rate can have a high value of 95% or higher when the mass ratio (WA/WB) is 7.3 or less. Namely, when carrot is used as the raw food material, if the mass ratio (WA/WB) is 7.3 or less (preferably, 6.8 or less), the sheet-shaped food product is not folded or broken even when it is wound on a rice ball, and the sheet-shaped food product can have both the volume and strength, and also the flexibility at sufficient level.

Furthermore, among the raw food materials described above, carrot is one of the most difficult food materials from which the volume and strength, and also the flexibility can be obtained when a sheet-shaped food product is produced therewith. As such, it is demonstrated that, even when a food material other than carrot is used as the raw food material, if the mass ratio (WA/WB) is 7.3 or less (preferably, 6.8 or less), the sheet-shaped food product can have both the volume and strength, and also the flexibility at sufficient level such that the sheet-shaped food product is not folded or broken even when it is wound on a rice ball.

Example 5

According to the production method described above, a sheet-shaped food product was produced in which soy bean powder is used as the raw food material, mass ratio (WA/WB) of dry mass of the raw food material (WA) to dry mass of the binding agent (WB) is 7.3, and mass ratio (WA/WC) of dry mass of the raw food material (WA) to dry mass of the moisture retention agent (WC) is 1.3.

Example 6 to Example 8, Comparative Example 2

The sheet-shaped food product was produced in the same manner as Example 5 except that the mass ratio (WA/WB) of dry mass of the raw food material (WA) to dry mass of the binding agent (WB) has a value shown in Table 2.

[Palate Test]

The sheet-shaped food product of Example 5 to Example 8 and Comparative Example 2 was wound on a rice ball, and used as a sample for palate test. Five monitoring people who have no idea about the material of the sheet-shaped food product were allowed to eat the sample, and then evaluated the taste based on the following evaluation criteria, and the mean value of the evaluation is shown in Table 2. Furthermore, when the evaluation criteria value is 1.0 or higher, it is considered that the taste of the material can be sufficiently recognized.

(Evaluation Criteria)
2: Taste of soy bean powder is felt
1: Taste of bean is felt, but has no idea that it is soy bean powder
0: No feeling of bean taste

TABLE 2

|  | Raw food material | WA/WB | WA/WC | Palate evaluation |
| --- | --- | --- | --- | --- |
| Example 5 | Soy bean powder | 7.3 | 1.3 | 1.8 |
| Example 6 | Soy bean powder | 6.8 | 1.3 | 1.8 |
| Example 7 | Soy bean powder | 5.4 | 1.3 | 1.6 |
| Example 8 | Soy bean powder | 4.9 | 1.3 | 1.2 |
| Comparative Example 2 | Soy bean powder | 2.5 | 1.3 | 0.6 |

As shown in Table 2, when soy bean powder is used as the raw food material, an evaluation criteria value as high as 1.0 or higher can be obtained if the mass ratio (WA/WB) is 4.9 or more (preferably, 5.4 or more). Namely, in a case in which soy bean powder is used as the raw food material, when the mass ratio (WA/WB) is 4.9 or more (preferably, 5.4 or more), the taste of the material can be sufficiently recognized even when the sheet-shaped food product is wound on a rice ball.

Furthermore, among the raw food materials described above, soy bean powder is one of the most difficult food materials from which the taste of the material can be recognized when a sheet-shaped food product is produced therewith. As such, it is demonstrated that, even if a food material other than soy bean powder is used as the raw food material, as long as the mass ratio (WA/WB) is 4.9 or more (preferably, 5.4 or more), the taste of the material can be sufficiently recognized even when the sheet-shaped food product is wound on a rice ball.

Based on the results of the operability test of Example 1 to Example 4 and Comparative Example 1, and the palate test of Example 5 to Example 8 and Comparative Example 2, it was confirmed that, as the mass ratio (WA/WB) of dry mass of the raw food material (WA) to dry mass of the binding agent (WB) is 4.9 to 7.3 (preferably, 5.4 to 6.8), the sheet-shaped food product can have both the volume and strength, and also the flexibility irrespective of the raw food material 2, and the recognition of the taste can be felt.

Example 9 to Example 12

The sheet-shaped food product was produced in the same manner as Example 1 except that the mass ratio (WA/WC) of dry mass of the raw food material (WA) to dry mass of the moisture retention agent (WC) has a value shown in Table 3. Furthermore, the sheet-shaped food product of Example 12 does not contain any moisture retention agent.

[Moisture Retention Property Test]

The sheet-shaped food product of Example 1 and Example 9 to Example 12 was heated for 5 minutes at 40° C., and the same test (moisture retention property test) as the aforementioned operability test was carried out. The results are shown in Table 3.

TABLE 3

|  | Raw food material | WA/WB | WA/WC | Success rate in moisture retention property test |
| --- | --- | --- | --- | --- |
| Example 1 | Carrot | 4.9 | 0.8 | 95% |
| Example 9 | Carrot | 4.9 | 0.9 | 92.5% |
| Example 10 | Carrot | 4.9 | 1.2 | 87.5% |
| Example 11 | Carrot | 4.9 | 1.3 | 85% |
| Example 12 | Carrot | 4.9 | — | 60% |

As shown in Table 3, in a case in which carrot is used as the raw food material, success rate of the moisture retention property test is 80% or more, which is not inferior to the success rate before heating, if the mass ratio (WA/WC) is 1.3 or less (preferably, 1.2 or less). Namely, it is considered that, in a case in which carrot is used as the raw food material, the sheet-shaped food product has a sufficient moisture retention property and has sufficient operability even immediately after the production at which over-dried state easily occurs, and thus it can be easily wound on a roll, if the mass ratio (WA/WC) is 1.3 or less (preferably, 1.2 or less). It is also considered that, as the sheet-shaped food product has sufficient operability even after long-term storage during which an over-dried state easily occurs, the sheet-shaped food product is not likely to be folded or broken even when it is wound on a rice ball.

Furthermore, among the raw food materials described above, carrot is one of the most difficult food materials from which the moisture retention property can be obtained when a sheet-shaped food product is produced therewith. As such, it is demonstrated that, even if a food material other than carrot is used as the raw food material, as long as the mass ratio (WA/WC) is 1.3 or less (preferably, 1.2 or less), the sheet-shaped food product has a sufficient moisture retention property, and thus yielding favorable operability during drying.

Example 13 to Example 16

The sheet-shaped food product was produced in the same manner as Example 5 except that the mass ratio (WA/WC) of dry mass of the raw food material (WA) to dry mass of the moisture retention agent (WC) has a value shown in Table 4.

[Palate Test]

For the sheet-shaped food product of Example 5 and Example 13 to Example 16, the same test as the aforementioned palate test was carried out. The results are shown in Table 4.

[Mouth Feel Test]

The sheet-shaped food product of Example 5 and Example 13 to Example 16 was used as a sample for mouth feel test. After eating the sample, five monitoring people evaluated each of the feel upon chewing and touch feel on tongue based on the following evaluation criteria, and the mean value of the evaluation is shown in Table 5. Furthermore, when the evaluation criteria value is 2 or higher for both the feel upon chewing and touch feel on tongue, it is considered that the sheet-shaped food product has favorable mouth feel.

(Feel Upon Chewing and Evaluation Criteria)
2: Favorable feel upon chewing, and crispy mouth feel is recognized
1: Favorable feel upon chewing, but crispy mouth feel is not recognized
0: Poor feel upon chewing (Touch Feel on Tongue and Evaluation Criteria)
2: Favorable touch feel on tongue, and the sheet-shaped food product immediately disappeared in mouth
1: Favorable touch feel on tongue, but the sheet-shaped food product slightly remains in mouth
0: Poor touch feel on tongue, and the sheet-shaped food product adheres in mouth

TABLE 4

| | Raw food material | WA/WB | WA/WC | Palate evaluation | Mouth feel evaluation | |
| --- | --- | --- | --- | --- | --- | --- |
| | | | | | Feel upon chewing | Touch feel on tongue |
| Example 5 | Soy bean powder | 7.3 | 1.3 | 1.8 | 2 | 2 |
| Example 13 | Soy bean powder | 7.3 | 1.2 | 1.8 | 2 | 2 |
| Example 14 | Soy bean powder | 7.3 | 0.9 | 1.8 | 2 | 2 |
| Example 15 | Soy bean powder | 7.3 | 0.8 | 1.6 | 2 | 2 |
| Example 16 | Soy bean powder | 7.3 | 0.6 | 1.4 | 1 | 1 |

As shown in Table 4, even after the mass ratio (WA/WC) is changed to 1.3 or less when soy bean powder is used as the raw food material, there was no significant difference in the evaluation results (palate evaluation and mouth feel evaluation). Specifically, with regard to the palate test, in a case in which the mass ratio (WA/WC) is less than 0.9 and a case in which the mass ratio (WA/WC) is less than 0.8, a decrease in the criteria value is recognized. However, the values were all high evaluation criteria value of 1.0 or more. Furthermore, with regard to mouth feel evaluation, when the mass ratio (WA/WC) is less than 0.8, the criteria value was 1 or more but the mouth feel was tender and soft.

Furthermore, among the raw food materials described above, soy bean powder is one of the most difficult food materials from which the taste of the material can be recognized and also favorable mouth feel (in particular, feel upon chewing) can be achieved when a sheet-shaped food product is produced therewith. As such, it is demonstrated that, even if a food material other than soy bean powder is used as the raw food material, as long as the mass ratio (WA/WC) is 0.8 or more (preferably, 0.9 or more), the taste and mouth feel of the material can be sufficiently recognized even when the sheet-shaped food product is wound on a rice ball.

Based on the results of the moisture retention property test of Example 1 and Example 9 to Example 12 and the palate test and mouth feel test of Example 5 and, Example 13 to Example 16, it is confirmed that, as the mass ratio (WA/WC) of dry mass of the raw food material (WA) to dry mass of the moisture retention agent (WC) is 0.8 to 1.3 (preferably, 0.9 to 1.2), the sheet-shaped food product can have both the mouth feel and operability (moisture retention property) during drying irrespective of the raw food material 2 to be used, and also the taste of the material can be recognized.

Example 17

According to the production method described above, by using carrot as a raw food material, the sheet-shaped food product in which the mass ratio (WA/WB) of dry mass of the raw food material (WA) to dry mass of the binding agent (WB) is 4.9 to 7.3, the mass ratio (WA/WC) of dry mass of the raw food material (WA) to dry mass of the moisture retention agent (WC) is 0.8 to 1.3, and the thickness of the inner side layer is 20 μm, the thickness of the surface layer is 90 μm, and the total thickness is 200 μm was produced.

Example 18 to Example 31

The sheet-shaped food product in which each of the inner side layer thickness, surface layer thickness, and the overall thickness has a value shown in Table 5 was produced by having the same raw food material and mass ratios (WA/WB) and (WA/WC) as those of Example 17.

[Mouth Feel Test]

For the sheet-shaped food product of Example 17 to Example 31, the same mouth feel test as described above was carried out. The results are shown in Table 5.

TABLE 5

| | Inner side layer (μm) | Surface layer (μm) | Total (μm) | Mouth feel evaluation | |
| --- | --- | --- | --- | --- | --- |
| | | | | Feel upon chewing | Touch feel on tongue |
| Example 17 | 20 | 90 | 200 | 1 | 2 |
| Example 18 | 70 | 90 | 250 | 2 | 2 |
| Example 19 | 120 | 90 | 300 | 2 | 1 |
| Example 20 | 170 | 90 | 350 | 2 | 0 |

TABLE 5-continued

|  | Inner side layer (μm) | Surface layer (μm) | Total (μm) | Feel upon chewing | Touch feel on tongue |
|---|---|---|---|---|---|
| Example 21 | 70 | 40 | 150 | 1 | 2 |
| Example 22 | 70 | 140 | 350 | 2 | 1 |
| Example 23 | 70 | 190 | 450 | 2 | 0 |
| Example 24 | 20 | 40 | 100 | 0 | 2 |
| Example 25 | 20 | 60 | 140 | 1 | 2 |
| Example 26 | 60 | 40 | 140 | 1 | 2 |
| Example 27 | 70 | 100 | 270 | 2 | 2 |
| Example 28 | 30 | 120 | 270 | 2 | 2 |
| Example 29 | 120 | 140 | 400 | 2 | 1 |
| Example 30 | 20 | 190 | 400 | 2 | 0 |
| Example 31 | 120 | 190 | 500 | 2 | 0 |

As shown in Table 5, when carrot is used as the raw food material, the sheet-shaped food product can have both favorable feel upon chewing and favorable touch feel on tongue if the thickness of the inner side layer is 20 to 120 μm (preferably, 30 to 70 μm), the thickness of the surface layer is 40 to 140 μm (preferably, 90 to 120 μm), and the total thickness is 140 to 400 μm (preferably, 150 to 310 μm). Namely, as long as the thickness of the inner side layer is 20 to 120 μm, the thickness of the surface layer is 40 to 140 μm, and the total thickness is 140 to 400 μm, the sheet-shaped food product can have the flexibility, strength, and volume, each at optimum level, and thus favorable mouth feel (crispy feeling and also hardly any remaining in mouth) can be achieved.

Furthermore, among the raw food materials described above, carrot is one of the most difficult food materials from which the most favorable mouth feel (in particular, touch feel on tongue) can be achieved when the sheet-shaped food product is produced therewith. As such, it is demonstrated that, even in a case in which a food material other than carrot is used as the raw food material, if the thickness of the inner side layer is 20 to 120 μm (preferably, 30 to 70 μm), the thickness of the surface layer is 40 to 140 μm (preferably, 90 to 120 μm), and the total thickness is 140 to 400 μm (preferably, 150 to 310 μm), the sheet-shaped food product can have the flexibility, strength, and volume, each at optimum level, and thus favorable mouth feel can be achieved.

EXPLANATION OF REFERENCE NUMERALS

1 SHEET-SHAPED FOOD PRODUCT
2 RAW FOOD MATERIAL
3 BINDING AGENT
10 SURFACE LAYER
20 INNER SIDE LAYER

What is claimed is:

1. A sheet-shaped food product that is molded by containing a mixture of a raw food material and a binding agent,
    in which the sheet-shaped food product is provided with a surface layer at both sides, and
    an inner side layer, which is present between the surface layers and has lower density than each of the surface layers, and
    mass ratio (WA/WB) of dry mass of the raw food material (WA) to dry mass of the binding agent (WB) is 4.9 to 7.3, and
    the mass ratio WA/WB of the inner side layer and each of the surface layers is the same.

2. The sheet-shaped food product according to claim 1, wherein the sheet-shaped food product further contains a moisture retention agent, and
    mass ratio (WA/WC) of dry mass of the raw food material (WA) to dry mass of the moisture retention agent (WC) is 0.8 to 1.3.

3. The sheet-shaped food product according to claim 1, wherein a total thickness of the sheet-shaped food product is 140 to 400 μm.

4. The sheet-shaped food product according to claim 2, wherein a total thickness of the sheet-shaped food product is 140 to 400 μm.

5. The sheet-shaped food product according to claim 1, wherein the inner side layer is substantially void and a thickness of the inner side layer is 20 to 120 μm.

6. The sheet-shaped food product according to claim 2, wherein the inner side layer is substantially void and a thickness of the inner side layer is 20 to 120 μm.

7. The sheet-shaped food product according to claim 1, wherein the inner side layer is substantially void and a thickness of the two surface layers is 40 to 140 μm for each.

8. The sheet-shaped food product according to claim 2, wherein the inner side layer is substantially void and a thickness of the two surface layers is 40 to 140 μm for each.

9. The sheet-shaped food product according to claim 1, wherein the raw food material is at least one selected from the group consisting of:
    leaf vegetables that can pass through a sieve with a mesh size of 1.5 to 3 mm;
    root vegetables that can pass through a sieve with a mesh size of 0.5 to 2 mm;
    fishes and shellfishes that can pass through a sieve with a mesh size of 1.5 to 3 mm;
    sea weeds that can pass through a sieve with a mesh size of 0.5 to 3 mm; and
    beans that can pass through a sieve with a mesh size of 0.2 mm or less.

10. The sheet-shaped food product according to claim 2, wherein the raw food material is at least one selected from the group consisting of:
    leaf vegetables that can pass through a sieve with a mesh size of 1.5 to 3 mm;
    root vegetables that can pass through a sieve with a mesh size of 0.5 to 2 mm;
    fishes and shellfishes that can pass through a sieve with a mesh size of 1.5 to 3 mm;
    sea weeds that can pass through a sieve with a mesh size of 0.5 to 3 mm; and
    beans that can pass through a sieve with a mesh size of 0.2 mm or less.

11. The sheet-shaped food product according to claim 3, wherein the raw food material is at least one selected from the group consisting of:
    leaf vegetables that can pass through a sieve with a mesh size of 1.5 to 3 mm;
    root vegetables that can pass through a sieve with a mesh size of 0.5 to 2 mm;
    fishes and shellfishes that can pass through a sieve with a mesh size of 1.5 to 3 mm;
    sea weeds that can pass through a sieve with a mesh size of 0.5 to 3 mm; and
    beans that can pass through a sieve with a mesh size of 0.2 mm or less.

12. The sheet-shaped food product according to claim 4, wherein the raw food material is at least one selected from the group consisting of:

leaf vegetables that can pass through a sieve with a mesh size of 1.5 to 3 mm;

root vegetables that can pass through a sieve with a mesh size of 0.5 to 2 mm;

fishes and shellfishes that can pass through a sieve with a mesh size of 1.5 to 3 mm;

sea weeds that can pass through a sieve with a mesh size of 0.5 to 3 mm; and beans that can pass through a sieve with a mesh size of 0.2 mm or less.

13. The sheet-shaped food product according to claim 5, wherein the raw food material is at least one selected from the group consisting of:

leaf vegetables that can pass through a sieve with a mesh size of 1.5 to 3 mm;

root vegetables that can pass through a sieve with a mesh size of 0.5 to 2 mm;

fishes and shellfishes that can pass through a sieve with a mesh size of 1.5 to 3 mm;

sea weeds that can pass through a sieve with a mesh size of 0.5 to 3 mm; and beans that can pass through a sieve with a mesh size of 0.2 mm or less.

\* \* \* \* \*